(12) United States Patent
Manasso et al.

(10) Patent No.: US 6,554,892 B1
(45) Date of Patent: Apr. 29, 2003

(54) COMPOSITIONS AND METHODS FOR MAKING A COARSE PLATEY, HIGH BRIGHTNESS KAOLIN PRODUCT

(75) Inventors: John A. Manasso, Macon, GA (US); Bomi M. Bilimoria, Macon, GA (US); Leslie A. McLain, Macon, GA (US); Milton Constantin, Barcerena-Para (BR)

(73) Assignee: Imerys Kaolin, Inc., Dry Branch, GA (US)

(*) Notice: Subject to any disclaimer, the term of this patent is extended or adjusted under 35 U.S.C. 154(b) by 0 days.

(21) Appl. No.: 09/608,164

(22) Filed: Jun. 30, 2000

Related U.S. Application Data

(60) Provisional application No. 60/142,103, filed on Jul. 2, 1999.

(51) Int. Cl.[7] .................................................. C09C 1/42
(52) U.S. Cl. ..................... 106/486; 106/416; 106/484
(58) Field of Search ............................ 106/416, 486, 106/487, 484

(56) References Cited

U.S. PATENT DOCUMENTS

| | | | |
|---|---|---|---|
| 2,158,987 A | 5/1939 | Maloney | |
| 3,034,859 A | 5/1962 | Gunn et al. | |
| 3,171,718 A | * 3/1965 | Gunn et al. | 106/416 |
| 3,526,768 A | 9/1970 | Rai et al. | |
| 3,615,806 A | 10/1971 | Torock et al. | |
| 3,635,662 A | 1/1972 | Lyons | |
| 3,798,044 A | 3/1974 | Whitley et al. | |
| 4,125,411 A | * 11/1978 | Lyons | 106/416 |
| 4,176,148 A | 11/1979 | Magder et al. | |
| 4,183,991 A | 1/1980 | Smiley et al. | |
| 4,198,333 A | 4/1980 | von Bonin et al. | |
| 4,221,697 A | 9/1980 | Osborn et al. | |
| 4,225,496 A | 9/1980 | Columbus et al. | |
| 4,227,920 A | 10/1980 | Chapman et al. | |
| 4,233,199 A | 11/1980 | Abolins et al. | |
| 4,234,469 A | 11/1980 | Ohta et al. | |
| 4,241,142 A | * 12/1980 | Kaliski et al. | 106/486 |
| 4,243,574 A | 1/1981 | Manwiller | |
| 4,250,077 A | 2/1981 | van Bonin et al. | |
| 4,251,576 A | 2/1981 | Osborn et al. | |
| 4,298,711 A | 11/1981 | Moulson et al. | |
| 4,311,635 A | 1/1982 | Pearson | |
| 4,359,497 A | 11/1982 | Magder et al. | |
| 4,381,948 A | 5/1983 | McConnell et al. | |
| 4,409,344 A | 10/1983 | Moulson et al. | |
| 4,414,352 A | 11/1983 | Cohen et al. | |
| 4,427,450 A | * 1/1984 | Kostansek | 106/486 |
| 4,467,057 A | 8/1984 | Dieck et al. | |
| 4,543,287 A | 9/1985 | Briggs et al. | |
| 4,546,126 A | 10/1985 | Breitenfellner et al. | |
| 4,582,866 A | 4/1986 | Shain | |
| 4,584,333 A | 4/1986 | Prigent et al. | |
| 4,708,975 A | 11/1987 | Shain | |
| 4,795,776 A | 1/1989 | Milner | |
| 4,820,761 A | 4/1989 | Saito et al. | |

(List continued on next page.)

FOREIGN PATENT DOCUMENTS

| | | |
|---|---|---|
| DE | 2 241 577 | 3/1973 |
| DE | 24 49 656 | 12/1975 |
| DE | 26 58 814 | 2/1978 |
| DE | 28 18 954 | 11/1978 |
| DE | 27 39 620 | 3/1979 |
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 38 84 605 | 8/1988 |
| DE | 43 01 730 | 7/1993 |
| DE | 42 13 746 | 10/1993 |
| DE | 100 10 941 | 9/2001 |
| EP | 2 389 645 | 12/1978 |
| EP | 0 001 066 | 4/1980 |
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |

OTHER PUBLICATIONS

Brochure: "Kaopaques Delaminated Aluminum Silicates for Paint Systems," Georgia Kaolin Co., 433 N. Broad Street, Elizabeth, NJ 07207, Oct. 1975.

Burgess, Malcolm, "Kaolin, a Glacier Gift to Georgia," 1985. No month.

Clay Minerals Society Homepage, http://cms/lanl.gov/instruct.html , "Instructions for Authors, Clays and Clay Minerals," *Instructions for Authors*, p. 4 of 5. No date.

Jepson, W. P., "Kaolins, their properties and uses," *Phil. Trans. R. Soc. Lond.*, A311, 411–432, 1984. No month.

Swan. A., "Realistic paper test for various printing processes," *Printing Technology*, 13(1), 9–22, Apr. 1969.

(List continued on next page.)

*Primary Examiner*—Michael Marcheschi
(74) *Attorney, Agent, or Firm*—Finnegan, Henderson, Farabow, Garrett & Dunner , L.L.P.

(57) ABSTRACT

Coarse platey, high brightness kaolin products and methods for making the same, including combining a coarse kaolin fraction and a fine kaolin fraction, where each coarse or fine kaolin fraction may be produced by processing one or more crude kaolin samples through different stages of the methods of the present invention, by blending of one or more crude kaolin samples so processed, or as a by-product of a coarse or fine kaolin product.

20 Claims, 2 Drawing Sheets

U.S. PATENT DOCUMENTS

| | | | |
|---|---|---|---|
| 4,873,116 A | | 10/1989 | Ancker |
| 4,888,315 A | * | 12/1989 | Bowman et al. ............ 106/486 |
| 4,918,127 A | | 4/1990 | Adur et al. |
| 4,943,324 A | * | 7/1990 | Bundy et al. ............... 106/486 |
| 4,966,638 A | | 10/1990 | Mudgett |
| 4,981,521 A | | 1/1991 | Bettacchi et al. |
| 5,085,707 A | * | 2/1992 | Bundy et al. ............... 106/486 |
| 5,112,782 A | | 5/1992 | Brown et al. |
| 5,128,606 A | | 7/1992 | Gate et al. |
| 5,167,707 A | | 12/1992 | Freeman et al. |
| 5,168,083 A | | 12/1992 | Matthews et al. |
| 5,169,443 A | * | 12/1992 | Willis et al. ................ 106/486 |
| 5,294,654 A | | 3/1994 | Hellstern-Burnell et al. |
| 5,332,493 A | | 7/1994 | Ginn et al. |
| 5,364,899 A | | 11/1994 | Watanabe et al. |
| 5,411,587 A | | 5/1995 | Willis et al. |
| 5,416,151 A | | 5/1995 | Tanaka |
| 5,439,558 A | | 8/1995 | Bergmann et al. |
| 5,454,865 A | * | 10/1995 | Ginn et al. ................. 106/486 |
| 5,516,829 A | | 5/1996 | Davis et al. |
| 5,522,924 A | | 6/1996 | Smith et al. |
| 5,573,946 A | | 11/1996 | Haxell et al. |
| 5,578,659 A | | 11/1996 | Anada et al. |
| 5,624,488 A | | 4/1997 | Forbus et al. |
| 5,645,635 A | | 7/1997 | Behl et al. |
| 5,685,900 A | | 11/1997 | Yuan et al. |
| 5,707,912 A | | 1/1998 | Lowe et al. |
| 5,735,946 A | | 4/1998 | Bloodworth et al. |
| 5,749,958 A | * | 5/1998 | Behl et al. .................. 106/486 |
| 5,810,998 A | * | 9/1998 | Arrington-Webb et al. . 106/486 |
| 5,846,309 A | | 12/1998 | Freeman et al. |
| 5,879,512 A | | 3/1999 | McGenity et al. |
| 5,948,156 A | | 9/1999 | Coutelle et al. |
| 6,031,036 A | | 2/2000 | Rosenquist et al. |
| 6,149,723 A | * | 11/2000 | Pruett et al. ................ 106/486 |
| 6,186,335 B1 | * | 2/2001 | Arrington-Webb et al. . 106/486 |
| 6,262,161 B1 | | 7/2001 | Betso et al. |
| RE37,385 E | | 9/2001 | Okada et al. |
| 6,402,826 B1 | | 6/2002 | Yuan et al. |

FOREIGN PATENT DOCUMENTS

| | | |
|---|---|---|
| EP | 0 274 888 | 7/1988 |
| EP | 0 341 981 | 11/1989 |
| EP | 3 352 714 | 1/1990 |
| EP | 0 456 363 | 11/1991 |
| EP | 0 475 434 | 3/1992 |
| EP | 0 528 078 | 2/1993 |
| EP | 0 586 904 | 3/1994 |
| EP | 0 588 239 | 3/1994 |
| EP | 0 589 461 | 3/1994 |
| EP | 0 596 442 | 5/1994 |
| EP | 0 691 375 | 1/1996 |
| EP | 0 824 130 | 2/1998 |
| EP | 1 088 852 | 4/2001 |
| FR | 2 150 953 | 4/1973 |
| FR | 2 273 040 | 12/1975 |
| FR | 2 359 874 | 2/1978 |
| FR | 2 452 511 | 10/1980 |
| FR | 2 558 168 | 7/1985 |
| FR | 2 774 689 | 8/1999 |
| GB | 1032536 | 6/1966 |
| GB | 1118723 | 7/1968 |
| GB | 1375057 | 11/1974 |
| GB | 1469028 | 3/1977 |
| GB | 1493393 | 11/1977 |
| GB | 1513657 | 6/1978 |
| GB | 1597213 | 9/1981 |
| GB | 2223758 | 4/1990 |
| GB | 2240398 | 7/1991 |
| GB | 2310215 | 8/1997 |
| JP | 51005383 | 1/1976 |
| JP | 53016063 | 2/1978 |
| JP | 54010394 | 1/1979 |
| JP | 54047751 | 4/1979 |
| JP | 55131024 | 10/1980 |
| JP | 59074152 | 4/1984 |
| JP | 60023448 | 2/1985 |
| JP | 60038455 | 2/1985 |
| JP | 60084364 | 5/1985 |
| JP | 60161443 | 8/1985 |
| JP | 60235858 | 11/1985 |
| JP | 62116667 | 5/1987 |
| JP | 62232452 | 10/1987 |
| JP | 63132964 | 6/1988 |
| JP | 63175047 | 7/1988 |
| JP | 2-018362 | 1/1990 |
| JP | 2-034653 | 2/1990 |
| JP | 2-045551 | 2/1990 |
| JP | 4-122752 | 4/1992 |
| JP | 5-262974 | 10/1993 |
| JP | 6-016918 | 1/1994 |
| JP | 6-065490 | 3/1994 |
| JP | 6-502684 | 3/1994 |
| JP | 6-145442 | 5/1994 |
| JP | 7-502068 | 3/1995 |
| JP | 8-022945 | 1/1996 |
| JP | 10-114854 | 5/1998 |
| JP | 2000345032 | 12/2000 |
| JP | 2001098149 | 4/2001 |
| WO | WO 80/01167 | 6/1980 |
| WO | WO 80/02430 | 11/1980 |
| WO | WO 88/05804 | 8/1988 |
| WO | WO 90/11605 | 10/1990 |
| WO | WO 93/04119 | 3/1993 |
| WO | WO 94/07956 | 4/1994 |
| WO | WO 97/32934 | 9/1997 |
| WO | WO 97/34956 | 9/1997 |
| WO | WO 9837152 | 8/1998 |
| WO | WO 98/56860 | 12/1998 |
| WO | WO 98/58613 | 12/1998 |
| WO | WO 99/41309 | 8/1999 |
| WO | WO 99/51815 | 10/1999 |
| WO | WO 99/58613 | 11/1999 |
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 01/12708 | 2/2001 |
| WO | WO 01/46307 | 6/2001 |
| WO | WO 01/66627 | 9/2001 |
| WO | WO 01/66635 | 9/2001 |

OTHER PUBLICATIONS

Abstract, Japanese Patent No. 08012886A, publication date Jan. 1996.

Abstract, German Patent No. 3679147 No date.

Abstract, German Patent No. 3689760 No date.

Abstract, German Patent No. 3565272 No date.

Abstract, German Patent No. 3466547 No date.

Co-pending Application No. 09/647,720 Filed: Oct. 4, 2000 Attorney Docket No. 07812.0038–00.

Co-pending Application No. 09/903,994 Filed: Aug. 17, 2001 Attorney Docket No. 08819.0046–00.

Co-pending Application No. 09/937,671 Filed: Dec. 20, 2001 Attorney Docket No. 07810.0071–00.

Co-pending Application No. 09/937,729 Filed: Dec. 20, 2001 Attorney Docket No. 07810.0070–00.

Co-pending Application No. 10/077,936 Filed: Jul. 18, 2002 Attorney Docket No. 07810.0095–00.
Co-pending Application No. 10/277,285 Filed: Aug. 26, 2002 Attorney Docket No. 07810.0070–01.

Co-pending Application No. 10/233,599 Filed: Sep. 4, 2002 Attorney Docket No. 07810.0107–00.

* cited by examiner

COMPOSITIONS AND METHODS FOR MAKING A COARSE PLATEY, HIGH BRIGHTNESS KAOLIN PRODUCT

Pursuant to 35 U.S.C. § 119(e), this application claims benefit of the filing date of U.S. Provisional Patent Application No. 60/142,103 filed on Jul. 2, 1999.

BACKGROUND OF THE INVENTION

1. Field of the Invention

The present invention relates to the field of kaolin and kaolin products which are particularly useful for use in both paper coating and paper filling. More particularly, the present invention relates to kaolin clay products having unique coarse platey and high brightness characteristics and to methods for making and using such coarse platey, high brightness kaolin products.

2. Background

Fillers are utilized in the paper industry to reduce the amount of wood pulp needed to manufacture paper and provide optical and printing properties to the paper being produced. They are also used in other products including paints and plastics. Among the fillers suitable for use as fillers or coatings are titanium dioxide, calcium carbonate, silica, alumina and kaolin. Of these, kaolin, a hydrated aluminum silicate, is the most widely used.

Kaolin is obtained from kaolin crudes. The crudes can contain kaolin particles, oversize particle size impurities (grit), and fine and coarse particle size impurities, such as fine ferruginous or titaniferous impurities, which impart undesirable color to the clay. Kaolin particles typically occur in the crude over a wide range of particle sizes and shapes. Typically a kaolin crude, such as a typical Georgia crude will contain, after removing the grit, particles ranging in size from submicron or colloidal to 20 microns or larger. Moreover, the kaolin morphology typically includes arrangement in plates, which plates can be further arrayed in stacks. Particle size, impurity content and morphology can vary with location of the deposit and within any given deposit itself.

Kaolin particle size is typically determined by sedimentation using Stokes law to convert settling rates to particle size distribution and assuming a spherical shape of the particles. Particle size determined by this method is measured in terms of equivalent spherical diameter, or e.s.d., as determined by Sedigraph.

Kaolin brightness is typically determined by on a GE scale, where GE is measured as a percent brightness relative to magnesium oxide (MgO). As illustrated in Table I, the GE brightness of fine particle kaolins such as North American delaminated kaolin is 90. The GE brightness of coarse particle kaolins such as coarse European kaolins or coarse North American kaolins is 81–85, respectively.

Historically, kaolin pigments are available in a wide variety of grades and the selection of the particular grade of kaolin pigment used in a paper was as much a function of price as it was a function of its end use. Where the end use of the kaolin is as a filler or pulp extender to fill paper, the emphasis has typically been on the use of coarse particle kaolins such those that are disclosed and claimed, for example, in U.S. Pat. No. 4,943,324 (Bundy, et al.). Where the end use of the kaolin was as a coating to provide the paper with a smooth, aesthetically appealing appearance, however, the focus has typically been on the use of fine particle kaolins which have higher brightness and opacity characteristics such as those that are disclosed and claimed, for example, in U.S. Pat. Nos. 5,645,635 (Behl, et al.) and U.S. Pat. No. 5,169,443 (Willis, et al.).

The present invention provides a novel kaolin product and methods for making a novel kaolin product not heretofore known in the industry. The kaolin products of the present invention combines the unique characteristics of large particle size only found in coarse particle kaolins with high particle brightness characteristics only found in fine particle kaolins. The kaolin products of the present invention also demonstrates the unique characteristic of having a high shear rheology which enables the spraying drying of the product. The kaolin product of the present invention adaptable for use both as a paper filler and a paper coating. The methods of the present invention enable production of a number of coarse platey, high brightness kaolin products, each having different coarse platey and high brightness characteristics. The methods of the present invention also enable the preservation of resources by utilizing kaolin fractions which may have been previously discarded when fabricating one or the other of a coarse or fine kaolin product.

SUMMARY OF THE INVENTION

The present invention provides at least one coarse platey, high brightness kaolin product and a method for making this kaolin product. The kaolin product produced by the method of the present invention has the unique qualities of high brightness, good opacity, very good high and low shear viscosity and large particle size, which make them equally adaptable for coating and filler applications, as well.

Specifically, the present invention provides coarse platey, high brightness kaolin products which are formed by the combination of a coarse kaolin fraction and a fine kaolin fraction. Each coarse platey, high brightness kaolin product produced by this method has a particle size of at least 40% greater than two microns ($\mu$) and a minimum high shear rheology of 800 rpm at 18 dynes and 68% solids using A-bob on a Hercules Viscometer. As is preferred, the coarse platey, high brightness kaolin product of the present invention may be spray dried or combined with a suspending agent to stabilize the kaolin slurry product for use, storage and/or shipment.

The coarse and fine kaolin fractions of the kaolin products of the present invention consist of one or more crude kaolin samples which are processed through different stages of the methods of the present invention, of a blending of one or more crude kaolin samples so processed, or of a by-product of the processing of a crude kaolin sample to a coarse or fine kaolin product.

The methods for making a coarse platey, high brightness kaolin products include the steps of combining a coarse kaolin fraction with a fine kaolin fraction to form the coarse platey, high brightness kaolin products. Depending on the desired manner of use, shipping and/or storage, the methods of the present invention further include the step of either spray drying or adding a suspending agent to the slurry to stabilize the coarse platey, high brightness kaolin product after combination of the two kaolin fractions.

The coarse platey, high brightness kaolin products of the present invention are produced by varying the quantity of each coarse and fine kaolin fraction which is combined in accordance with the methods of the present invention. The variability of the quantity of coarse and fine kaolin fractions combined to form the kaolin product of the present invention and the possible different combinations of coarse and fine kaolin fractions enable the production of a number of kaolin products having a unique coarse platey and high brightness characteristics.

BRIEF DESCRIPTION OF THE DRAWINGS

The above mentioned features of the invention will become more clearly understood from the following detailed description of the invention read together with the drawings in which.

DETAILED DESCRIPTION OF THE INVENTION

As used in the specification and the claims, "a" can mean one or more, depending upon the context in which it is used.

The present invention provides at least one coarse platey, high brightness kaolin product and methods for making such kaolin products. The kaolin product has qualities making them useful for paper coating application, such as high brightness, good opacity and very good high and low shear viscosity, as well as properties making it useful in paper filler applications.

Specifically, the present invention provides a coarse platey, high brightness kaolin product consisting of a coarse kaolin fraction and a fine kaolin fraction which are combined to form the coarse platey, high brightness kaolin product. As will be understood by those skilled in the art, the percentage of each kaolin fraction utilized in formation of the coarse platey, high brightness kaolin product may range from zero to one hundred percent. In the preferred embodiment, however, approximately equal measures of the coarse and fine kaolin fractions are combined to form the kaolin product.

The coarse platey, high brightness kaolin products of the present invention have a particle size of at least 40% greater than two microns ($\mu$) and a minimum high shear rheology of 800 rpm at 18 dynes and 68% solids using A-bob on a Hercules viscometer. Moreover, depending on the preferred manner of use, storage and/or shipment, the coarse platey, high brightness kaolin products of the present invention may be spray dried or may include a suspending agent to stabilize the slurry product. Where a suspending agent is added to the kaolin product to stabilize the slurry product for shipment, the kaolin product preferably forms a slurry of 66–68% solids. Other percentage solid compositions of kaolin product slurries which include a suspending agent are equally foreseeable.

In one embodiment of the present invention, the coarse platey, high brightness kaolin product of the present invention has a particle size of 40–65% greater than 2 microns, a GE brightness of 88 or greater and is spray dried.

In another embodiment of the present invention, the coarse platey, high brightness kaolin product has a particle size of 40–65% greater than 2 microns, a GE brightness of 88 or greater; and a minimum high shear rheology of 800 rpm at 18 dynes and 68% solids using A-bob on a Hercules viscometer. The kaolin product of this embodiment is also preferably spray dried.

In yet another embodiment, the coarse platey, high brightness kaolin product of the present invention has a particle size of 45–55% greater than two microns, a GE brightness of 89–91 and is spray dried.

In the preferred embodiment, the coarse platey, high brightness kaolin product of the present invention has a particle size of 45–55% greater than two microns, a GE brightness of 89–91, a minimum high shear rheology of 800 rpm at 18 dynes and 68% solids using A-bob on a Hercules viscometer and is spray dried.

Figure 1:
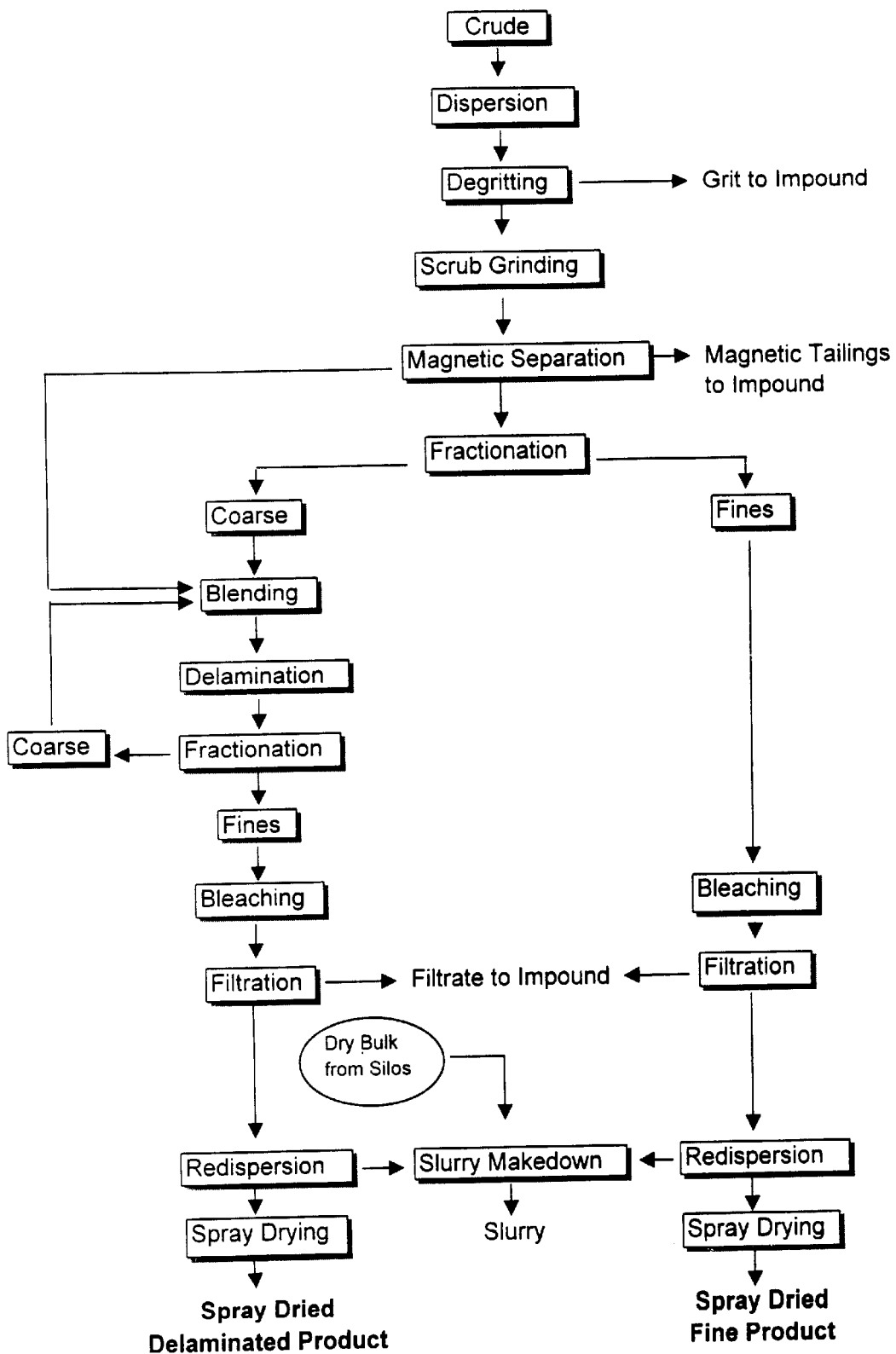
FIG. 1 is a process block diagram illustrating one process for performing the methods of the present invention
Figure 2:
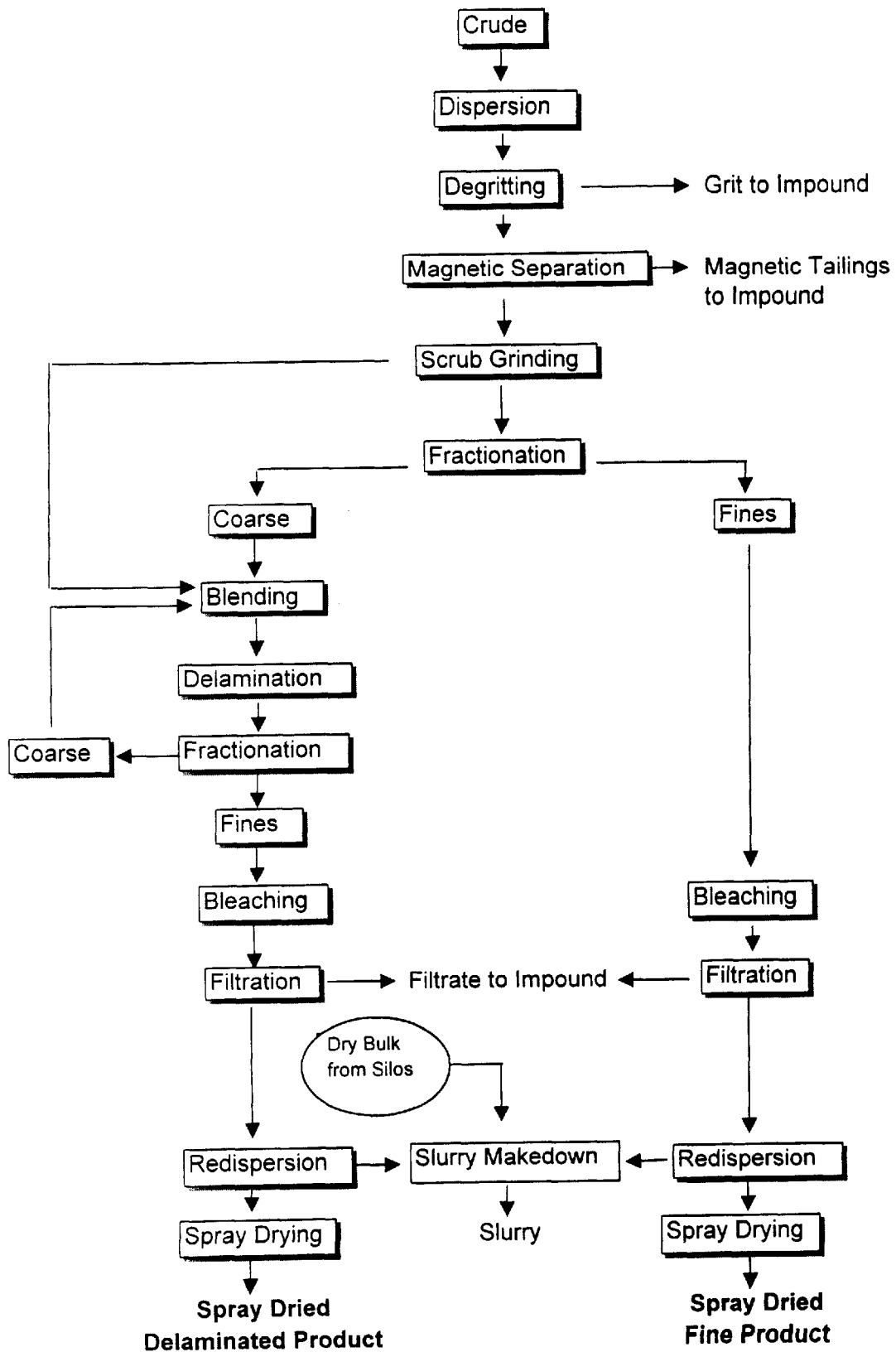
FIG. 2 is a process block diagram illustrating another process for performing the methods of the present invention

The method for making a coarse platey, high brightness kaolin product includes the steps of combining a coarse kaolin fraction with a fine kaolin fraction to form the coarse platey, high brightness kaolin product. As indicated in FIGS. 1 and 2, this method further includes the steps of bleaching and dewatering the individual kaolin fractions and/or the resulting kaolin products to further enhance the brightness characteristics of these compositions. Where the method for making a coarse platey, high brightness kaolin product includes the step of dewatering, that step is preferably performed by leaching the composition being dewatered with a sodium dithionite solution. As also indicated in FIGS. 1 and 2, as is preferred, the methods of the present invention may further include the step of spray drying the coarse platey, high brightness kaolin product after the bleaching and dewatering the kaolin product or that of adding a suspending agent to the product to produce a slurry for shipment purposes.

As those skilled in the art will recognize, there are a number of ways in which the kaolin fractions utilized in this method may be varied to yield the desired coarse platey, high brightness kaolin product. These variations in the practice of the method of the present invention are best understood by further consideration of FIGS. 1 and 2 in conjunction with the following description.

The coarse kaolin fraction of the present invention may be prepared in any one of several different ways. A first coarse kaolin fraction is prepared by delaminating and fractionating a blended kaolin. As illustrated in FIG. 1, the blended kaolin prepared by combining a crude kaolin sample which has been dispersed, degritted, magnetically separated, scrub ground and fractionated with a crude kaolin sample which has been dispersed, degritted, magnetically separated and scrub ground. Once blended, the kaolin is delaminated and fractionated. A second coarse kaolin fraction is prepared by dispersing, degritting, magnetically separating, scrub grinding and centrifuging a crude kaolin sample. A third coarse kaolin fraction is a high brightness platey product having a particle size typical of a number one coating clay is produced from the crude kaolin sample. A fourth coarse kaolin fraction is provided where a high brightness platey product having a particle size typical of a delaminated coating clay is produced from the crude kaolin sample.

As those skilled in the art will recognize, it is possible to varying the relative amounts of the processed crude kaolin samples that are blended to provide the first coarse kaolin fraction of the present invention. For example, the blended kaolin may consist of 30% of a crude kaolin sample that has been dispersed, degritted, magnetically separated, scrub ground and fractionated and 70% of a crude kaolin sample that has been dispersed, degritted, magnetically separated and scrub ground. Similarly, the blended kaolin may consist of 80% and 20% of each of these components, respectively. In the preferred embodiment, however, the blended kaolin consists of equal parts, or 50% each, of a crude kaolin sample that has been dispersed, degritted, magnetically separated, scrub ground and fractionated and a crude kaolin sample that has been dispersed, degritted, magnetically separated and scrub ground.

As those skilled in the art will also recognize, while the coarse kaolin fraction of the present invention is preferably prepared in the manners described, the coarse kaolin fraction can also be prepared by varying the process steps described, omitting some of these steps, or performing steps which are equivalent to those described. For example, as shown in FIG. 2, the same coarse kaolin fractions are produced where the step of magnetic separation is performed before the step of scrub grinding the crude kaolin sample being processed. Accordingly, it will be understood that such processes for producing the coarse kaolin fraction of the present invention, whether by variation of process step performed, variation in the number of process steps performed or variation in the manner of performing any of the described process steps, are contemplated by the present invention and that the descriptions of the processes for preparing the coarse kaolin fraction of the present invention provided herein are in no way intended to delimit the scope of this invention.

The fine kaolin fraction of the present invention is prepared in any one of several different ways. As may be best understood by consideration in conjunction with FIG. 1, a first manner for preparing a fine kaolin fraction is by dispersing and degritting a crude kaolin sample. A second manner for preparing fine kaolin fraction is by dispersing, degritting and magnetically separating a crude kaolin sample. A third manner for preparing fine kaolin fraction is by delaminating a blended kaolin that has been formed by the combination of a crude kaolin sample that has been dispersed, degritted, magnetically separated, scrub ground and centrifuged and a crude kaolin sample that has been dispersed, degritted, magnetically separated and scrub ground. A fourth fine kaolin fraction is prepared by dispersing, degritting, magnetically separating and scrub grinding a crude kaolin sample. A fifth fine kaolin fraction consists of a high brightness platey product having a particle size typical of a number one coating clay. A sixth fine kaolin fraction is a high brightness platey product having a particle size typical of a delaminated coating clay.

In further consideration of FIGS. 1 and 2, skilled artisans will also recognize other fine kaolin fractions are provided by the present invention which can be utilized in the methods of the present invention to produce coarse platey, high brightness kaolin products. Accordingly, a sixth fine kaolin fraction is provided as the by-product produced when the blended kaolin is delaminated and centrifuged to form the first coarse kaolin fraction. Similarly, a seventh fine kaolin fraction is also provided as the by-product of the process wherein the crude kaolin sample is centrifuged to produce the second coarse kaolin sample.

While other compositions are foreseeable, in the preferred embodiment, the third fine fraction consists of equal weights of a crude kaolin sample that has been dispersed, degritted, magnetically separated, scrub ground and centrifuged and a crude kaolin sample that has been dispersed, degritted, magnetically separated and scrub ground. Moreover, as those skilled in the art will recognize, the descriptions for the processes for forming the fine kaolin fractions of the present invention are in no way intended to delimit the scope of this aspect of the present invention as variations in the performance, order of performance and manner of performance of each of these processes are foreseeable, as well.

The preferred methods of the present invention contemplate preparing coarse platey, high brightness kaolin products by different combinations of the coarse and fine kaolin fractions of the present invention.

In a first method, a coarse platey, high brightness kaolin product is provided by combining a coarse kaolin fraction, which is prepared by delaminating and fractionating a blended kaolin, with a fine kaolin fraction which has been prepared by dispersing and degritting a crude kaolin sample. In this method, the blended kaolin is prepared by combining a crude kaolin sample which has been dispersed, degritted, magnetically separated, scrub ground and fractionated with a crude kaolin sample which has been dispersed, degritted, magnetically separated and scrub ground.

In a second method, a coarse platey, high brightness kaolin product is provided by combining the coarse kaolin fraction of the first method with a fine kaolin fraction which is prepared by dispersing, degritting and magnetically separating a crude kaolin sample.

In a third method, a coarse platey, high brightness kaolin product is provided by combining the coarse kaolin fraction of the first method with a fine kaolin fraction which is prepared by delaminating a blended kaolin. In this method, the blended kaolin is prepared by combining a crude kaolin sample that has been dispersed, degritted, magnetically separated, scrub ground and centrifuged with a crude kaolin sample that has been dispersed, degritted, magnetically separated and scrub ground.

In a fourth method, a coarse platey, high brightness kaolin product is provided by combining the coarse kaolin fraction of the first method with a fine kaolin fraction which is a high brightness platey product having a particle size typical of a number one coating clay.

In a fifth method, a coarse platey, high brightness kaolin product is provided by combining the coarse kaolin fraction of the first method with a fine kaolin fraction which is the by-product produced when the blended kaolin is delaminated and centrifuged to form the coarse kaolin fraction of the first method.

In a sixth method, a coarse platey, high brightness kaolin product is provided by combining the coarse kaolin fraction of the first method with a fine kaolin fraction which is a high brightness platey product having a particle size typical of a delaminated coating clay.

In a seventh method, a coarse platey, high brightness kaolin product is provided by combining a coarse kaolin fraction is prepared by dispersing, degritting, magnetically separating, scrub grinding and centrifuging a crude kaolin sample and combined with a fine kaolin fraction which has been prepared by dispersing and degritting a crude kaolin sample.

In an eighth method, a coarse platey, high brightness kaolin product is provided by combining the coarse kaolin fraction of the seventh method with a fine kaolin fraction which is prepared by dispersing, degritting and magnetically separating a crude kaolin sample.

In a ninth method, a coarse platey, high brightness kaolin product is provided by combining the coarse kaolin fraction of the seventh method with a fine kaolin fraction which is prepared by delaminating a blended kaolin. In this method, the blended kaolin is prepared by combining a crude kaolin sample that has been dispersed, degritted, magnetically separated, scrub ground and centrifuged with a crude kaolin sample that has been dispersed, degritted, magnetically separated and scrub ground.

In a tenth method, a coarse platey, high brightness kaolin product is provided by combining the coarse kaolin fraction of the seventh method with a fine kaolin fraction which is a high brightness platey product having a particle size typical of a number one coating clay.

In an eleventh method, a coarse platey, high brightness kaolin product is provided by combining the coarse kaolin fraction of the seventh method with a fine kaolin fraction which is the by-product produced when the blended kaolin is delaminated and centrifuged to form the coarse kaolin fraction of the first method.

In a twelfth method, a coarse platey, high brightness kaolin product is provided by combining the coarse kaolin fraction of the seventh method with a fine kaolin fraction which is a high brightness platey product having a particle size typical of a delaminated coating clay.

In each of these methods described, as is preferred, the brightness characteristic of kaolin components and/or the kaolin products produced is enhanced by the processes of bleaching and filtration. Where the components and/or products are bleached, the bleaching is preferably accomplished using sodium dithionite.

Although the present invention has been described with reference to specific details of certain embodiments thereof, it is not intended that such details should be regarded as limitations upon the scope of the invention except as and to the extent that they are included in the accompanying claims.

TABLE 1

Comparison of Kaolins: Particle Size and Brightness

| Kaolin | Equivalent Spherical Diameter % > 2μ | Brightness |
| --- | --- | --- |
| Coarse, platey, high brightness kaolin product | 40–65 | 88–90+ |
| Coarse European kaolin product | 60–70 | 79–81 |
| Coarse North American kaolin product | 30–45 | 84–85 |
| High Brightness North American Delaminated | 18–22 | 88–90 |

EXAMPLE I

| | Pigment Properties | | Paper Properties | | |
| --- | --- | --- | --- | --- | --- |
| Kaolin Product | Brightness | Particle Size (% > 2μ) | Ash Content (%) | Opacity | GE Brightness |
| Coarse English Filler Clay | 81 | 61 | 32.5 | 87.3 | 74.6 |
| Coarse High Brightness Platey Kaolin | 89 | 48 | 32.5 | 88.0 | 78.0 |

EXAMPLE II

| | Pigment Properties | | | Paper Properties @ 25% Ash | |
| --- | --- | --- | --- | --- | --- |
| Kaolin Product | GE Brightness | Particle Size (% > 2μ) | Opacity | GE Brightness | Retention (%) |
| Coarse North American Filler | 84.5 | 30 | 88.0 | 63.5 | 42 |
| Coarse High Brightness Platey Filler | 89.0 | 51 | 89.1 | 64.4 | 51 |

EXAMPLE III

| | Pigment Properties | | Paper Properties | | |
| --- | --- | --- | --- | --- | --- |
| Kaolin Product | GE Brightness | Particle Size (% > 2μ) | Opacity | GE Brightness | Scattering Coefficient ($m^2/g$) |
| Coarse South American Filler | 81 | 68 | 80.3 | 84.7 | 81 |
| Coarse High Brightness Platey Filler | 88 | 55 | 82.5 | 86.5 | 121 |

What is claimed is:

1. A coarse platey, high brightness kaolin product comprising kaolin particles, wherein at least 40% of the kaolin particles in the product have an equivalent spherical diameter of greater than two microns, and wherein the kaolin product has a GE brightness of 88 or greater and a minimum high shear rheology of 800 rpm at 18 dynes and 68% solids using A-bob on a Hercules viscometer.

2. The coarse platey, high brightness kalion product of claim 1, wherein the kalion product is a slurry of 66–68% solids containing a suspending agent for stabilization.

3. The kaolin product of claim 1, wherein the kaolin product is spray dried.

4. The coarse platey, high brightness kaolin product of claim 1, wherein 40–65% of the particles have an equivalent spherical diameter of greater than 2 microns.

5. A coarse platey, high brightness kaolin product comprising kaolin particles, wherein 45–55% of the kaolin particles in the product have an equivalent spherical diameter of greater than two microns, and wherein the kaolin product has a GE brightness of 89–91.

6. The coarse platey, high brightness kaolin product of claim 5, wherein the kaolin product is a slurry of 66–68% solids containing a suspending agent for stabilization.

7. The kaolin product of claim 5, wherein the kaolin product is spray dried.

8. A coarse platey, high brightness kaolin product comprising kaolin particles, wherein 45–55% of the kaolin particles in the product have an equivalent spherical diameter of greater than two microns, and wherein the kaolin product has a GE brightness of 89–91 and a minimum high shear rheology of 800 rpm at 18 dynes and 68% solids using A-bob on a Hercules viscometer.

9. The coarse platey, high brightness kaolin product of claim 8, wherein the kaolin product is a slurry of 66–68% solids containing a suspending agent for stabilization.

10. The kaolin product of claim 8, wherein the kaolin product is spray dried.

11. A method for making a coarse platey, high brightness kaolin product comprising kaolin particles having a GE brightness of 88 or greater and wherein at least 40% of the kaolin particles in the end product have an equivalent spherical diameter of greater than 2 microns comprising combining a coarse kaolin fraction in which the average equivalent spherical diameter of the kaolin particles is greater than two microns, with a fine kaolin fraction in which the average equivalent spherical diameter of the kaolin particles is less than two micron.

12. The method of claim 11, wherein the coarse kaolin fraction comprises a blend of a first coarse fraction of a crude kaolin sample with a second coarse fraction of a crude kaolin sample, the first coarse fraction resulting from treatment of the crude kaolin sample by processes comprising dispersion, degritting, magnetic separation, scrub grinding and centrifugation, and the second coarse fraction resulting from treatment of the crude kaolin sample by processes comprising dispersion, degritting, magnetic separation and scrub grinding, the coarse fraction blend being treated by processes comprising delamination and centrifugation.

13. The method of claim 11, wherein the coarse kaolin fraction comprises a coarse fraction of a crude kaolin sample resulting from treatment of the crude kaolin sample by processes comprising dispersion, degritting, magnetic separation, scrub grinding, and centrifugation.

14. The method of claim 11, wherein the fine kaolin fraction comprises a sample resulting from treatment of crude kaolin by processes comprising dispersion and degritting.

15. The method of claim 11, wherein the fine kaolin fraction comprises a sample resulting from treatment of crude kaolin by processes comprising dispersion, degritting and magnetic separation.

16. The method of claim 11, wherein the fine kaolin fraction comprises a sample resulting from treatment of crude kaolin by processes comprising dispersion, degritting, magnetic separation and scrub grinding.

17. A coarse platey, high brightness kaolin product comprising a blend mixture of a fine fraction and a coarse fraction and which is made according to the method of claim 12.

18. The coarse platey, high brightness kaolin product of claim 17, wherein the fine kaolin fraction used to make the product comprises a sample resulting from treatment of a crude kaolin by processes comprising dispersion and degritting.

19. The coarse platey, high brightness kaolin product of claim 17, wherein the fine kaolin fraction used to make the product comprises a sample resulting from treatment of a crude kaolin by processes comprising dispersion, degritting and magnetic separation.

20. The coarse platey, high brightness kaolin product of claim 17, wherein the fine kaolin fraction used to make the product comprises a sample resulting from treatment of a crude kaolin by processes comprising dispersion, degritting, magnetic separation and scrub grinding.

* * * * *

UNITED STATES PATENT AND TRADEMARK OFFICE
CERTIFICATE OF CORRECTION

PATENT NO.    : 6,554,892 B1
DATED         : April 29, 2003
INVENTOR(S)   : Manasso et al.

It is certified that error appears in the above-identified patent and that said Letters Patent is hereby corrected as shown below:

Column 8,
Lines 22 and 23, "kalion" should read -- kaolin --.
Line 61, "micron" should read -- microns --.

Column 10,
Line 2, "blend" should read -- blended --.

Signed and Sealed this

Nineteenth Day of August, 2003

JAMES E. ROGAN
*Director of the United States Patent and Trademark Office*